United States Patent
Quesada et al.

(10) Patent No.: US 12,366,919 B2
(45) Date of Patent: Jul. 22, 2025

(54) METHOD AND APPARATUS FOR THOUGHT PASSWORD BRAIN COMPUTER INTERFACE

(71) Applicant: Comcast Cable Communications, LLC, Philadelphia, PA (US)

(72) Inventors: Peter Quesada, Golden, CO (US); Daisy Henderson, Englewood, CO (US); Alexander Brewton, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 51 days.

(21) Appl. No.: 17/454,591

(22) Filed: Nov. 11, 2021

(65) Prior Publication Data

US 2023/0145037 A1    May 11, 2023

(51) Int. Cl.
*G06F 3/01* (2006.01)
*G06F 21/32* (2013.01)
*G06N 20/00* (2019.01)

(52) U.S. Cl.
CPC .............. *G06F 3/015* (2013.01); *G06F 21/32* (2013.01); *G06N 20/00* (2019.01)

(58) Field of Classification Search
CPC .... G06F 1/163; G06F 3/015; G06F 3/02–027; G06F 21/00–88; G06F 2203/011; G06F 2221/00–2153; G06N 20/00–20; G06N 3/08–0895; G06K 9/6232; G06K 9/6297; A61B 5/00–7495; H04L 63/08–0892
See application file for complete search history.

(56) References Cited

U.S. PATENT DOCUMENTS

| | | | |
|---|---|---|---|
| 10,831,922 B1* | 11/2020 | Paterson | G06Q 20/327 |
| 2007/0266273 A1* | 11/2007 | Adachi | G06F 3/015 |
| | | | 714/49 |
| 2009/0063866 A1 | 3/2009 | Navratil et al. | |
| 2010/0280403 A1* | 11/2010 | Erdogmus | G06F 3/015 |
| | | | 600/545 |
| 2014/0020089 A1 | 1/2014 | Perini, II | |
| 2014/0051044 A1* | 2/2014 | Badower | A61B 5/369 |
| | | | 434/236 |
| 2015/0338917 A1 | 11/2015 | Steiner et al. | |
| 2019/0370650 A1* | 12/2019 | Wheeler | A61F 2/72 |
| 2022/0129534 A1* | 4/2022 | Croxford | A61B 5/378 |

\* cited by examiner

*Primary Examiner* — Amr A Awad
*Assistant Examiner* — Aaron Midkiff
(74) *Attorney, Agent, or Firm* — BakerHostetler

(57) ABSTRACT

Systems and methods are described herein for authentication and password security. The system may detect involuntary and voluntary brain signals of a user and measure the characteristics of those signals. The signals may be detected and analyzed using a wearable device comprising a plurality of sensors. The system may authenticate the identity of the user by triggering the user to imagine content or react to presented content. The content may comprise an image or movement, and brain signals of the user may indicate signals that are consistent for the user. The system may authenticate the user based on the brain signals based on data stored for the user or profile for the user. This determination may be performed by a machine learning model trained to classify users based on the brain signal data.

18 Claims, 6 Drawing Sheets

400

---

RECEIVE, VIA A WEARABLE DEVICE COMPRISING A PLURALITY OF SENSORS AND CONFIGURED TO AUTHENTICATE A USER, INFORMATION INDICATIVE OF:
- AN INVOLUNTARY SIGNAL GENERATED, BY THE USER, BASED ON A RESPONSE TO A STIMULUS, WHEREIN THE STIMULUS COMPRISES CONTENT, AND
- A VOLUNTARY SIGNAL GENERATED, BY THE USER, BASED ON A THOUGHT ASSOCIATED WITH THE CONTENT

410

↓

DETERMINE, BASED ON THE INVOLUNTARY SIGNAL AND THE VOLUNTARY SIGNAL, AN INDICATION OF A PASSWORD ASSOCIATED WITH THE USER

METHOD AND APPARATUS FOR THOUGHT PASSWORD BRAIN COMPUTER INTERFACE

BACKGROUND

Security and privacy have become major concerns as users increasingly rely on interconnected devices and services. Techniques for authentication and password security such as use of unique biometric signatures including biometrics such as heart rate, fingerprints, or facial characteristics are widely available. However, existing techniques present a risk, for example, when passwords are exploited and hacked. Accordingly, there is a need for improved techniques for authentication and password security.

SUMMARY

Systems and methods are described herein for authentication and password security. The system may authenticate a user based on the response of the user to a stimulus such as imagined or presented content. The content may comprise a movement, an image, a scene, a smell, a taste, a sound, etc., or any combination thereof. For example, the system may prompt the user to imagine movement of an object, person, animal, and during this imagined movement, brain signals of the user may indicate signals that are unique and consistent for the user. The system may capture involuntary and voluntary brain signals of the user in response to the stimulus and measure the characteristics of those signals. The signals may be captured and analyzed using a wearable device comprising a plurality of sensors. The wearable device (e.g., a headband, a shirt, a bracelet, a watch, a chair seat and/or arm, etc.) may be configured to emphasize one or more sensors, while de-emphasizing other sensors, on a per user basis (e.g., based on a shape of a head of the user). The system may authenticate the user by comparing a combination of the involuntary and voluntary brain signals, captured by the wearable device, to brain signal data stored for the user. For example, the brain signals captured for the user may indicate signals that correlate, or match, brain signal data stored for the user. The data may be stored in a database and may be associated with a profile for the user. This determination may be performed by a machine learning model trained to classify users based on the brain signal data.

BRIEF DESCRIPTION OF THE DRAWINGS

The following drawings show generally, by way of example, but not by way of limitation, various examples discussed in the present disclosure. In the drawings:

FIG. 4 shows an example method.

DETAILED DESCRIPTION OF ILLUSTRATIVE EMBODIMENTS

Figure 1:
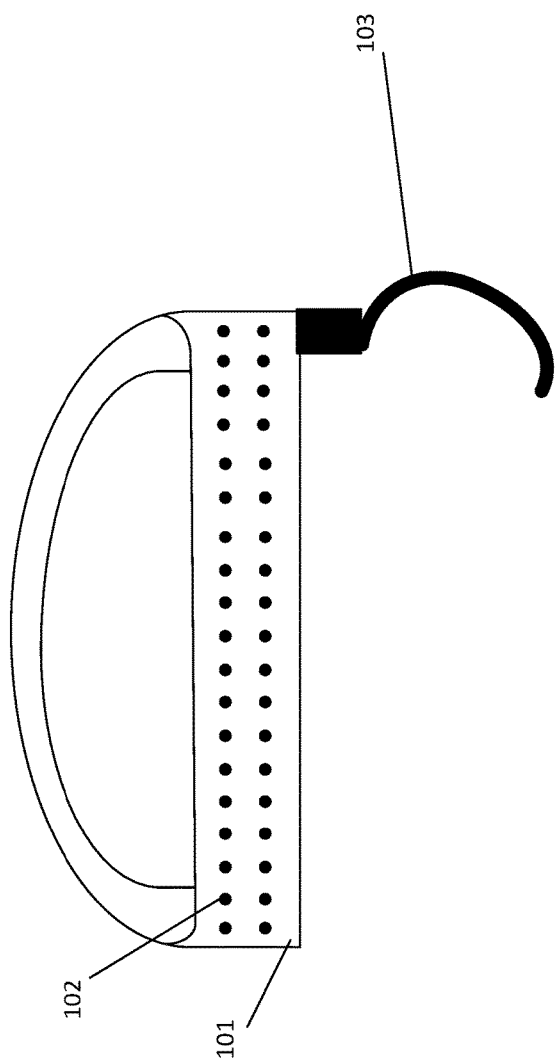
FIG. 1 shows an example device.

Systems and methods are described herein for authentication and password security. The techniques disclosed herein use the characteristics of the brain signals of a user when that user responds to a stimulus. The system may capture involuntary and voluntary brain signals of the user in response to the stimulus and measure the characteristics of those signals. A combined signal may be determined based on the involuntary and voluntary brain signals.

The signals may be captured and analyzed using a device comprising a plurality of sensors. The device may comprise a wearable device, such as, for example, a headband, a shirt, a bracelet, a watch, a chair seat and/or arm, etc. The device may be configured for that user. For example, the wearable device may be configured to emphasize one or more sensors, while de-emphasizing other sensors, on a per user basis (e.g., based on a shape of a head of the user).

The system may perform an initial authentication of the user. The system may initiate authentication of the identity of the user by prompting the user to react to a stimulus such as presented content or to imagine content. This reaction may be referred to as a movement password. For example, the movement password may comprise an imagined movement such as the moving of an arm or a hand in a certain orientation. During this imagined movement, brain signals of the user show a small and slow drift in strength that is consistent and unique for each user between sessions. The system authenticates the user's identity when measured data associated with the brain signals is determined to be consistent with data stored for the user. The data may be stored in a database and may be associated with a profile for the user. This determination may be performed by a machine learning model trained to classify users based on the brain signal data.

The system may then request that the authenticated user identify a thought password, which may comprise a stimulus such as motor imagery (e.g., imagined movement of an object in an orientation), a cognitive image (e.g., an imagined beach), a scene, a smell, a taste, a sound, etc. For example, the imagined movement may comprise an imagined movement of a common object in an unusual orientation. For example, the imagined movement of an object in an orientation may comprise an imagined movement of a common object in an unusual orientation such as an upside-down object. For example, the upside-down object may be a common object such as an upside-down traffic cone or sign. Each thought password may be associated with content such as a trigger word or an image. The trigger word or image may comprise a stimulus to prompt the user to imagine the thought password. The thought password may be selected from a plurality of thought passwords associated with the user. For example, the user may have configured the plurality of thought passwords used by the system. For example, the plurality of thought passwords may be associated with the user profile. The system may randomly select a thought password from the plurality of thought passwords and cause output of the trigger word or image as a stimulus to the user. For example, the system may cause display of the trigger word or image.

The user may imagine, based on the stimulus of the trigger word or image, the thought password. For example, the word "dog" may be displayed on a display device, which prompts the user to imagine a scene of playing fetch with their dog. The user imagining this thought password may cause generation of the brain signals used by the system for determining authentication credentials associated with the user. The brain signals may comprise an involuntary signal and a voluntary signal.

The system may determine, based on the involuntary signal and the voluntary signal, a combined signal. The combined signal may be compared to data associated with the user. For example, the data indicated by the combined signal may match or may be consistent with data in the user profile. For example, the data indicated by the combined signal may be used by a machine learning model to determine that the combined signal matches or is consistent for that user.

The system may use one or more signal processing techniques to analyze the involuntary signal and the voluntary signal. For example, the system may perform frequency domain analysis using Fast Fourier Transforms. The system may also use machine learning techniques to analyze the involuntary signal and the voluntary signal. For example, the system may comprise an autoregressive model for Independent Component Analysis (ICA) or a distinction sensitive learning vector quantization classifier. The techniques used may be based on the type and quantity of the sensors of the wearable device used to receive the brain signals.

The involuntary signal may be generated in response to the stimulus of the trigger word or image being presented to the user. The involuntary signal may comprise, for example, a P300 signal, which is an uncontrolled positive brain signal deflection that occurs roughly 300 ms after an unpredicted, but relevant, stimulus is presented to the user. The response may confirm not only the user specific signal deflection, but also that the timing of these deflections matches the user. Determining the password may comprise determining that data associated with the user specific signal deflection and the timing of the deflections indicated by the involuntary signal is associated with the user.

Determining the authentication credentials may comprise comparing data associated with the frequency bands of the voluntary signal. For example, the system may determine that the mu rhythm (8-12 Hz) frequency band is associated with the user. A mu rhythm, while occurring in all people, is unique to each individual and as such, confirms the identity of the user. The system may determine that the timing and deflection pattern of the characteristic "event-related desynchronization" that occurs within the alpha, mu, beta, and low gamma frequency bands (8-35 Hz roughly) when the user visualizes the thought password after the stimulus is associated with the user.

As a result of this system, the user is also relieved of having to memorize numerous, complex alphanumeric passwords. Further, because the thought passwords can be reconfigured, the system does not rely on unchangeable metrics. Moreover, thought passwords are nearly impossible to replicate or misappropriate.

FIG. 1 shows an example device 100. The device 100 may comprise a wearable device 100. The wearable device 100 may comprise a band 101 comprising an array of multiple thought capture sensors (e.g., electroencephalography (EEG) sensors) such as a plurality of sensors 102. In other embodiments, the wearable device may comprise, for example, a shirt, a bracelet, a watch, a chair seat and/or arm, etc. The device (e.g., a headband, a shirt, a bracelet, a watch, a chair seat and/or arm, etc.) may be configured to emphasize one or more sensors, while de-emphasizing other sensors, on a per user basis (e.g., based on a shape of a head of the user). The device 100 may be configured to determine, on a per user basis, which sensors of the plurality of sensors 102 to emphasize and/or deemphasize based on how each sensor contacts the user (e.g., how each sensor contacts the user's head) and captures signals/avoids noise.

In the example of device 100, the sensors 102 may be located on the band 101 to wrap around the head of the user. For example, the sensors 102 may be located on the band 101 to wrap around the left and right sides of the forehead of the user. The sensors 102 may comprise, for example, EEG sensors. The sensors 102 may measure brain activity related to a person's thoughts as a way to authenticate that person. The sensors 102 may be arranged as an array on the device 100, and the band 101 may be worn on a user's forehead so that optimal signal sensing can be achieved every time the device 100 is used.

The characteristics of the electrical signals that can be measured on people are unique to each individual. Further, because people have varying head sizes, the physical locations on the forehead where optimal brain activity occurs for measurement varies from person to person. As a result, wearing the band 101 may enable the device 100 to determine the optimal signal sensing locations for a user using information indicating the location of optimal signal strength. To augment the repeatability of measurements from one user to another, a vertical bar 103, or another position marking feature, may be attached to one side of the band 101 that comprises the sensors 102 that may be placed against the back of the left ear of the user. This may assure that the location that the sensors 102 are placed on the individual's head is the same location every time it is used. The vertical bar 103 may comprise a grounding mechanism and may help with placement location consistency.

In the case that some individuals share the same locations of optimal signal strength, authentication may still be achieved due to the uniqueness of the characteristics of the electrical signals that are measured as mentioned above. Therefore, when an individual's EEG signals are being measured to record training data for use in training the machine learning model used to classify users based on the brain signal data, the optimal sensor 102 locations may be determined and recorded. Provided there are no significant changes to the cranial structure of a user, e.g., due to an unforeseen surgery or trauma, the same optimal locations may be measured and can be used as a secondary method of authentication. Since it is possible for multiple individuals to share the same optimal sensor locations, the primary authentication method may use the machine learning model based on the initial training data. Inferencing might be based on a neural network that is built by a machine learning model that has been trained with the user's input stimulus data that has been recorded.

Because the wearable device 100 comprises a plurality of sensors 102, it enables the use of bipolar sensor filtering. Bipolar sensor filtering may be accomplished by identifying the signals from the non-optimal sensors, measuring the noise seen in these signals, and using it to negate noise in the signals from the sensors that were identified as being optimal.

Figure 2:
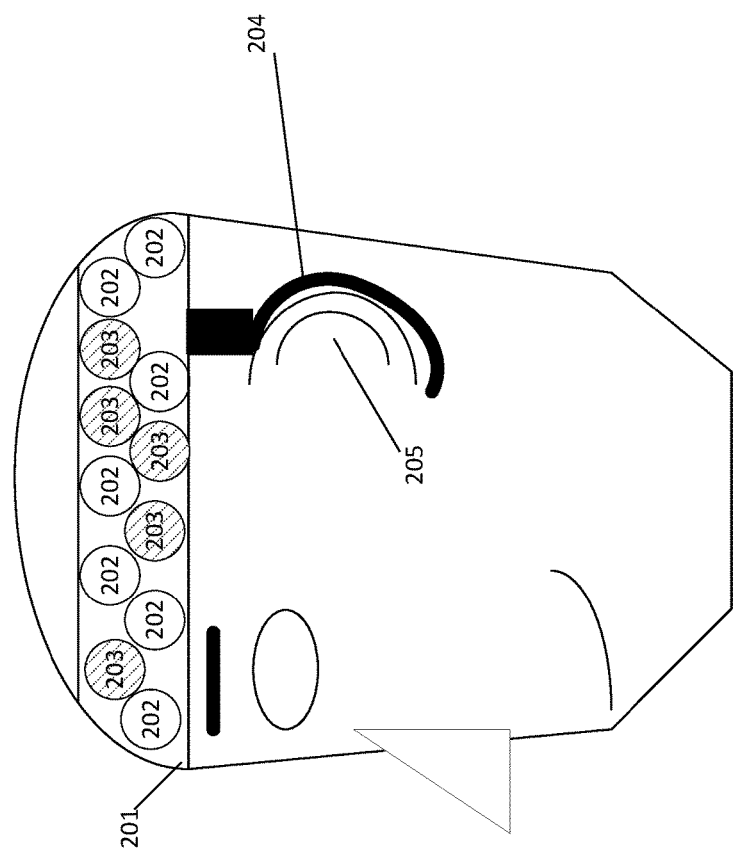
FIG. 2 shows an example device.

FIG. 2 shows an example device worn on a user 200. The device 200 may comprise a wearable device 200 comprising a band 201 worn on the forehead of the user. The band 201 may comprise a plurality of sensors 202, 203. The sensors 202, 203 may be located on the band 201 to wrap around the entire head of the user. For example, the sensors 202, 203 may be located on the band 201 to wrap around the left and right sides of the forehead of the user. The sensors 202, 203 may comprise, for example, EEG sensors. The sensors 202, 203 may measure brain activity related to the thoughts of the user to authenticate that user. The sensors 202, 203 may be arranged as an array on the device 200.

The band 201 may be configured to determine the physical locations on the forehead where optimal brain activity occurs for measurement, which varies from user to user. A vertical bar 204 may be attached to one side of the band that comprises the sensors 202, 203 that may be placed against the back of the left ear 205 of the user. This placement may cause the location that the sensors 202, 203 are placed on the individual's head to be the same location every time it is used. The vertical bar 204 may comprise a grounding mechanism and may help with placement location consistency. The band 201 may be configured to emphasize one or more sensors 202, while de-emphasizing other sensors 203, on a per user basis (e.g., based on a shape of a head of the user). The band 201 may be configured to determine, on a per user basis, which sensors 202, 203 to emphasize and/or deemphasize based on how each sensor contacts the user (e.g., how each sensor contacts the user's head) and captures signals/avoids noise. In the example of FIG. 2, sensors 202 are emphasized (e.g., turned on), while sensors 203 are de-emphasized (e.g., turned off).

Figure 3:
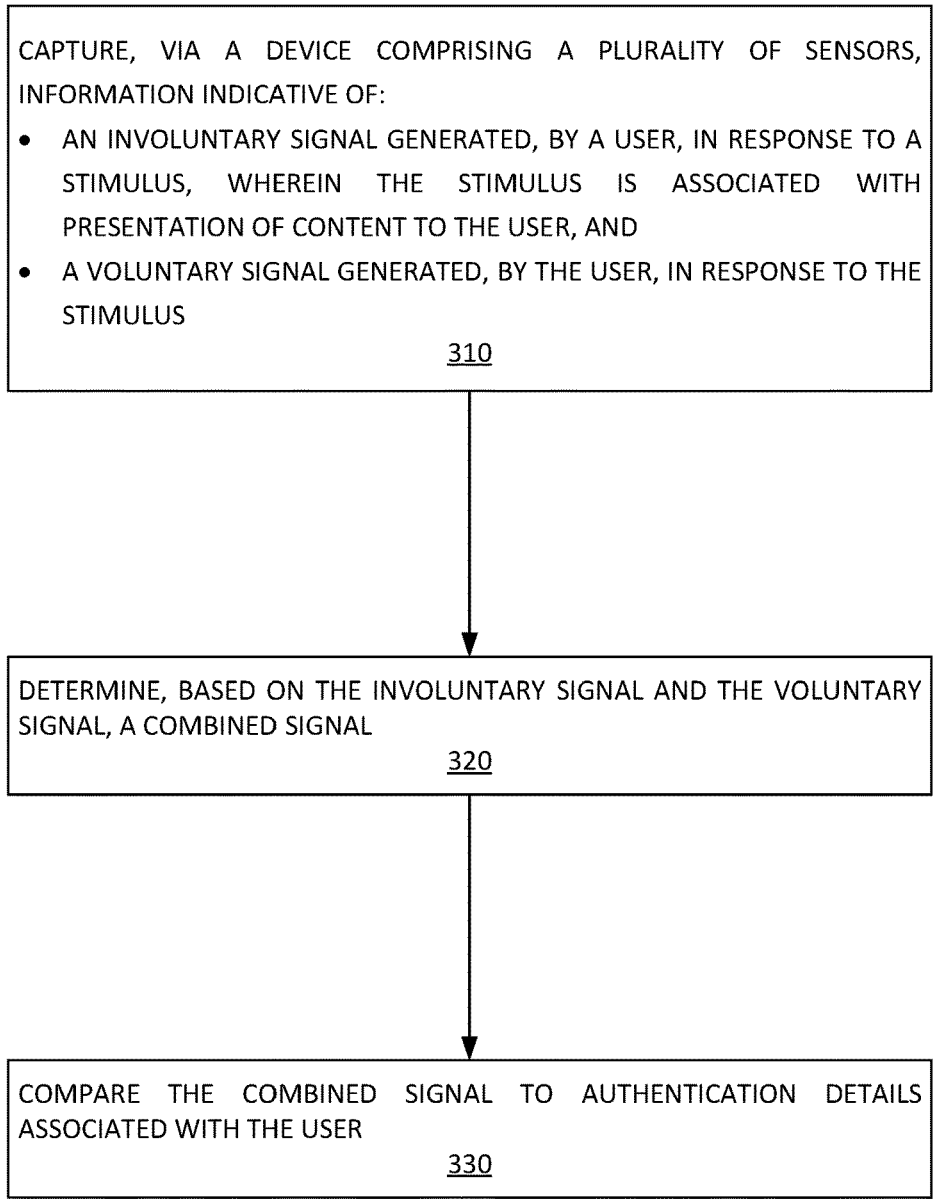
FIG. 3 shows an example method.

FIG. 3 shows an example method 300. The method 300 of FIG. 3 may be performed, for example, by any of the devices described herein, such as for example, the devices depicted in FIG. 1 or FIG. 2. While each step in the method 300 of FIG. 3 is shown and described separately, multiple steps may be executed in a different order than what is shown, in parallel with each other, concurrently with each other, or serially with each other. At step 310, information may be captured via a device comprising a plurality of sensors. The information may be indicative of an involuntary signal that is generated, by a user, in response to a stimulus. The information may be indicative of a voluntary signal generated, by the user, in response to the stimulus. The device may be configured to emphasize and deemphasize one or more sensors of the plurality of sensors based on how the one or more sensors contact the user, capture the involuntary signal and the voluntary signal, and avoid noise.

The stimulus may be associated with the presentation of content. For example, the stimulus may comprise a movement, an image, a scene, a smell, a taste, a sound, etc., or any combination thereof. The presentation of content may indicate a random selection from a thought from a plurality of thoughts. During the response to the stimulus, brain signals of the user may indicate a small or slow drift in strength that is consistent for the user. The plurality of thoughts may be associated with the user. For example, the user may have configured the plurality of thoughts. For example, the plurality of thoughts may be associated with a user profile.

The device may, for example, comprise a wearable device such as a headband, a shirt, a bracelet, a watch, a chair seat and/or arm, etc. The device (e.g., a headband, a shirt, a bracelet, a watch, a chair seat and/or arm, etc.) may be configured to emphasize one or more sensors, while de-emphasizing other sensors, on a per user basis (e.g., based on a shape of a head of the user). The device may cause a machine learning model to authenticate the user based on the electrical characteristics unique to the user. The identity of the user may be authenticated when measured data associated with the brain signals is determined to be consistent with data stored for the user. The data may be stored in a database and may be associated with the profile for the user. This determination may be performed by the machine learning model, which has been trained to classify users based on the brain signal data.

At step 320, a combined signal may be determined based on the involuntary signal and the voluntary signal. At step 330, the combined signal may be compared to authentication credentials associated with the user. Data indicated by the involuntary signal and the voluntary signal may match or may be consistent with data in the user profile. For example, the data indicated by the involuntary signal and the voluntary signal may be used by a machine learning model to determine that the involuntary signal and the voluntary signal match or are consistent for that user. The user may be authenticated based on the comparing.

The comparing may comprise comparing a signal deflection of the involuntary signal to data associated with the user. The comparing may comprise comparing a timing of a signal deflection to data associated with the user. The comparing may comprise comparing a mu rhythm associated with the involuntary signal to data associated with the user.

The comparing may comprise comparing one or more characteristics associated with the voluntary signal to data associated with the user. The one or more characteristics may comprise an event-related desynchronization in at least one of: an alpha frequency band, a mu frequency band, a beta frequency band, or a low gamma frequency band. The comparing may be performed by a machine learning model and may cause output of an indication of the authentication credentials by the machine learning model.

FIG. 4 shows an example method 400. The method 400 of FIG. 4 may be performed, for example, by any of the devices described herein, such as for example, the devices depicted in FIG. 1 or FIG. 2. While each step in the method 400 of FIG. 4 is shown and described separately, multiple steps may be executed in a different order than what is shown, in parallel with each other, concurrently with each other, or serially with each other. At step 410, information may be received via a wearable device comprising a plurality of sensors and configured to authenticate a user. The information may be indicative of an involuntary signal that is generated, by the user, based on a response to a stimulus. The information may be indicative of a voluntary signal generated, by the user, based on a thought associated with the content.

The stimulus may comprise content. The content may comprise a displayed image or word associated with the thought. The displayed image may indicate a random selection of the thought from the plurality of thoughts. The thought may comprise at least one of: a form of motor imagery, an imagined movement, or a cognitive image. During the thought, brain signals of the user may indicate a small or slow drift in strength that is consistent for the user. The thought may be selected from a plurality of thoughts associated with the user. For example, the user may have configured the plurality of thoughts. For example, the plurality of thoughts may be associated with the user profile. The thought password may be associated with content such as a trigger word or an image. The trigger word or image may comprise the stimulus to prompt the user to imagine the thought. The thought may be selected from the plurality of thoughts and cause output of the trigger word or image as the stimulus.

The wearable device may, for example, comprise a headband, a shirt, a bracelet, a watch, a chair seat and/or arm, etc. The wearable device (e.g., a headband, a shirt, a bracelet, a watch, a chair seat and/or arm, etc.) may be configured to emphasize one or more sensors, while de-emphasizing other sensors, on a per user basis (e.g., based on a shape of a head of the user). The device may cause a machine learning model to authenticate the user based on the shape. The identity of the user may be authenticated when measured data associated with the brain signals is determined to be consistent with data stored for the user. The data may be stored in a database and may be associated with a profile for the user. This determination may be performed by the machine learning model, which has been trained to classify users based on the brain signal data.

At step 420, a password associated with the user may be determined. The password may be determined based on the involuntary signal and the voluntary signal. The determining may comprise determining that a signal deflection of the involuntary signal is associated with the user. The determining may comprise determining that a timing of a signal deflection is associated with the user. The determining may comprise determining that a mu rhythm associated with the involuntary signal is associated with the user. The determining may comprise determining that one or more characteristics associated with the voluntary signal is associated with the user.

The one or more characteristics may comprise an event-related desynchronization in at least one of: an alpha frequency band, a mu frequency band, a beta frequency band, or a low gamma frequency band. The determining may be performed by a machine learning model and may cause output of an indication of the password by the machine learning model. The user may be authenticated based on signal generated in response to a thought.

Figure 5:
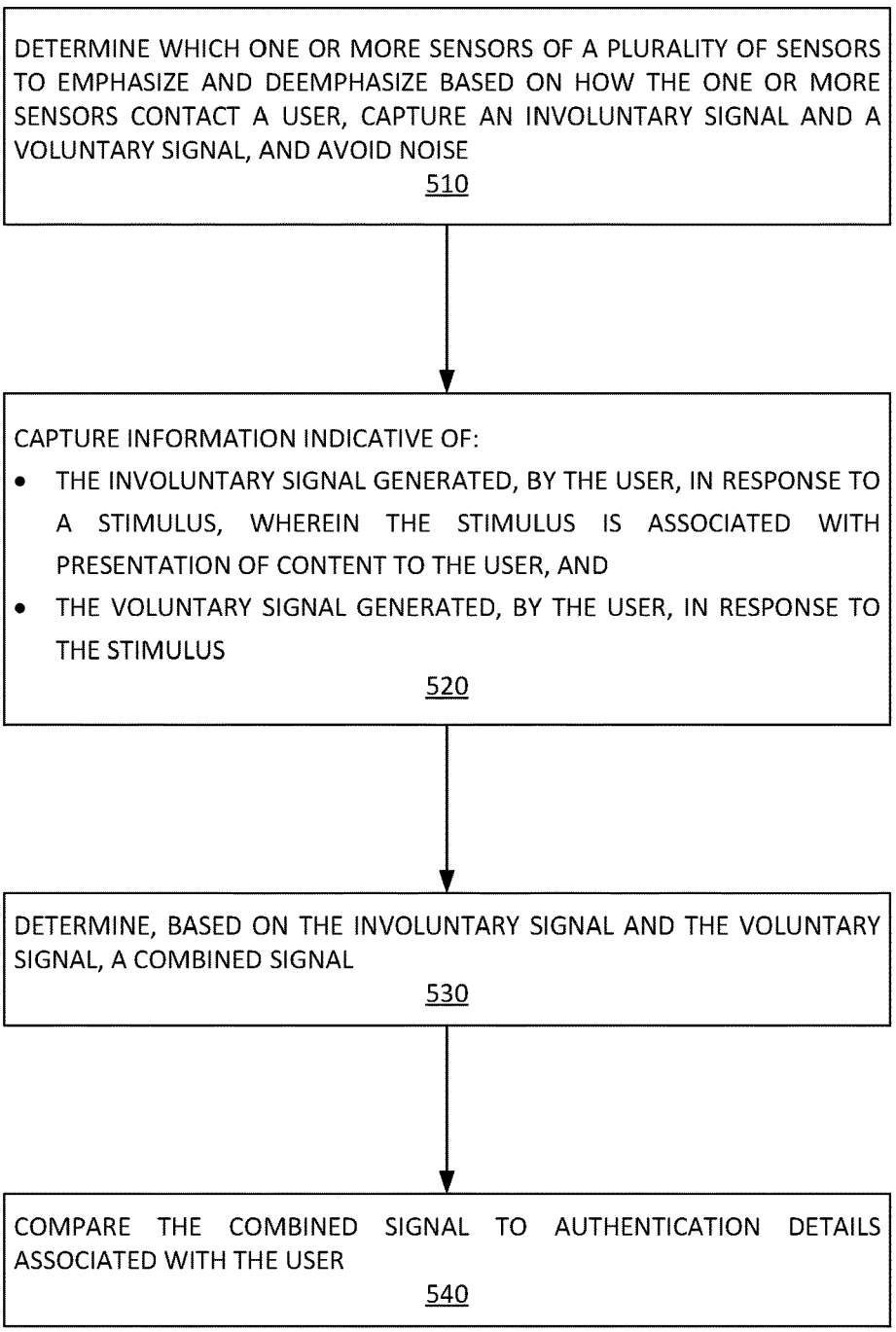
FIG. 5 shows an example method.

FIG. 5 shows an example method 500. The method 500 of FIG. 5 may be performed, for example, by any of the devices described herein such as for example, the devices depicted in FIG. 1 or FIG. 2. While each step in the method 500 of FIG. 5 is shown and described separately, multiple steps may be executed in a different order than what is shown, in parallel with each other, concurrently with each other, or serially with each other. At step 510, a device may be configured to determine which one or more sensors of a plurality of sensors to emphasize and deemphasize based on how the one or more sensors contact a user, capture an involuntary signal and a voluntary signal, and avoid noise.

At step 520, information may be captured via the device. The information may be indicative of the involuntary signal that is generated, by the user, in response to a stimulus. The information may be indicative of the voluntary signal generated, by the user, in response to the stimulus.

The stimulus may be associated with the presentation of content. For example, the stimulus may comprise a movement, an image, a scene, a smell, a taste, a sound, etc., or any combination thereof. The presentation of content may indicate a random selection from a thought from a plurality of thoughts. During the response to the stimulus, brain signals of the user may indicate a small or slow drift in strength that is consistent for the user. The plurality of thoughts may be associated with the user. For example, the user may have configured the plurality of thoughts. For example, the plurality of thoughts may be associated with a user profile.

The device may, for example, comprise a wearable device such as a headband, a shirt, a bracelet, a watch, a chair seat and/or arm, etc. The device (e.g., a headband, a shirt, a bracelet, a watch, a chair seat and/or arm, etc.) may be configured to emphasize one or more sensors, while de-emphasizing other sensors, on a per user basis (e.g., based on a shape of a head of the user). The device may cause a machine learning model to authenticate the user based on the electrical characteristics unique to the user. The identity of the user may be authenticated when measured data associated with the brain signals is determined to be consistent with data stored for the user. The data may be stored in a database and may be associated with the profile for the user. This determination may be performed by the machine learning model, which has been trained to classify users based on the brain signal data.

At step 530, a combined signal may be determined based on the involuntary signal and the voluntary signal. At step 540, the combined signal may be compared to authentication credentials associated with the user. Data indicated by the involuntary signal and the voluntary signal may match or may be consistent with data in the user profile. For example, the data indicated by the involuntary signal and the voluntary signal may be used by a machine learning model to determine that the involuntary signal and the voluntary signal match or are consistent for that user. The user may be authenticated based on the comparing.

The comparing may comprise comparing a signal deflection of the involuntary signal to data associated with the user. The comparing may comprise comparing a timing of a signal deflection to data associated with the user. The comparing may comprise comparing a mu rhythm associated with the involuntary signal to data associated with the user.

The comparing may comprise comparing one or more characteristics associated with the voluntary signal to data associated with the user. The one or more characteristics may comprise an event-related desynchronization in at least one of: an alpha frequency band, a mu frequency band, a beta frequency band, or a low gamma frequency band. The comparing may be performed by a machine learning model and may cause output of an indication of the authentication credentials by the machine learning model.

Figure 6:
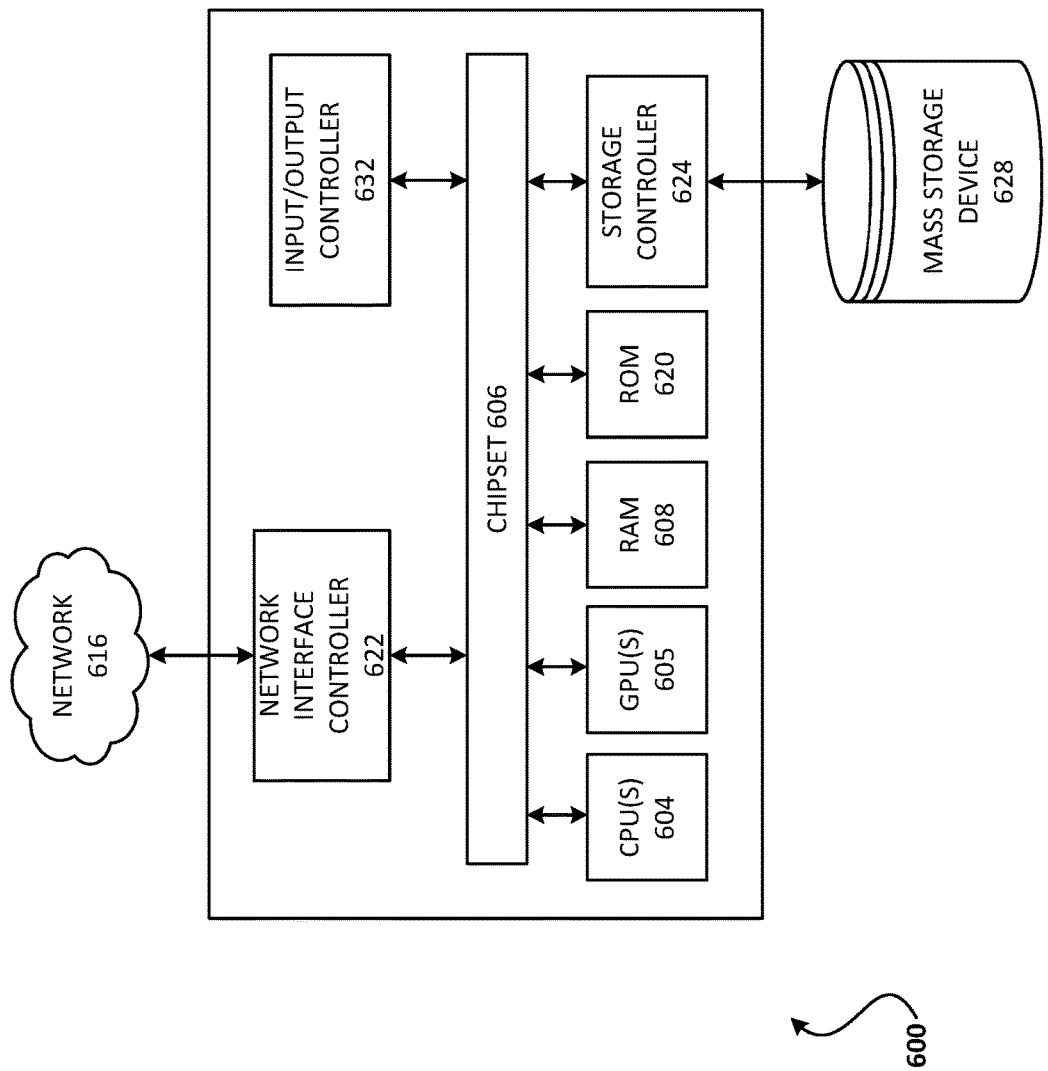
FIG. 6 depicts an example computing device.

FIG. 6 depicts a computing device 600 that may be used in various aspects, such as the servers, encoders, computing device, and other devices depicted in FIGS. 1-2. With regard to the example architectures of FIGS. 1-2, the devices may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   prompting a reaction of a user to presented content, wherein the reaction of the user comprises a movement password;
   based on capturing, via a device comprising a plurality of sensors, information indicative of the movement password, authenticating an identity of the user;
   based on authenticating the identity of the user, prompting the user to imagine a thought password;
   capturing, via the device comprising the plurality of sensors, information indicative of:
   an involuntary signal generated, by a user, in response to being prompted to imagine the thought password, and
   a voluntary signal generated, by the user, in response to being prompted to imagine the thought password;
   determining, based on the involuntary signal and the voluntary signal, a combined signal; and
   comparing the combined signal to authentication credentials associated with the user.

2. The method of claim 1, wherein the comparing comprises comparing at least one of:
   a signal deflection of the involuntary signal,
   a timing of the signal deflection, and
   a mu rhythm associated with the involuntary signal.

3. The method of claim 2, wherein the one or more characteristics comprises an event-related desynchronization in at least one of: an alpha frequency band, a mu frequency band, a beta frequency band, or a low gamma frequency band.

4. The method of claim 1, wherein the comparing comprises:
   determining that one or more characteristics associated with the combined signal is associated with the user.

5. The method of claim 1, wherein the comparing is performed by a machine learning model, and the comparing causes output of an indication of the authentication credentials by the machine learning model.

6. The method of claim 1, wherein the thought password comprises at least one of an image, a movement, a scene, a smell, a taste, or a sound.

7. The method of claim 1, wherein the involuntary signal comprises a P300 signal.

8. The method of claim 1, wherein the device comprises a wearable device that is configured to:
   emphasize one or more sensors of the plurality of sensors based on a shape of a head of the user, and
   cause a machine learning model to authenticate the user based on the shape.

9. The method of claim 1, further comprising:
   determining which one or more sensors of the plurality of sensors to emphasize and deemphasize based on how the one or more sensors contact the user, capture the involuntary signal and the voluntary signal, and avoid noise.

10. A method comprising:
    prompting a reaction of a user to presented content, wherein the reaction of the user comprises a movement password;
    based on receiving, via a device comprising a plurality of sensors, information indicative of the movement password, authenticating an identity of the user;
    based on authenticating the identity of the user, prompting the user to imagine a thought password;
    receiving, via the device comprising the plurality of sensors, information indicative of:
    an involuntary signal generated, by the user, based on being prompted to imagine the thought password, and
    a voluntary signal generated, by the user, based on being prompted to imagine the thought password; and
    determining, based on the involuntary signal and the voluntary signal, an indication of a password associated with the user.

11. The method of claim 10, wherein the determining comprises:
    determining that:
    a signal deflection of the involuntary signal,
    a timing of the signal deflection, and
    a mu rhythm associated with the involuntary signal, are associated with the user.

12. The method of claim 10, wherein the determining comprises:
    determining that one or more characteristics associated with the voluntary signal is associated with the user, wherein the one or more characteristics comprises an event-related desynchronization in at least one of: an alpha frequency band, a mu frequency band, a beta frequency band, or a low gamma frequency band.

13. The method of claim 10, wherein the thought password comprises an image, a movement, a scene, a smell, a taste, or a sound.

14. The method of claim 10, wherein the device is configured to: emphasize one or more sensors of the plurality of sensors based on a shape of a head of the user, and cause a machine learning model to authenticate the user based on the shape.

15. A device comprising:
a plurality of sensors; and
wherein the device is configured to:
determine which one or more sensors of the plurality of sensors to emphasize and deemphasize based on how the one or more sensors contact a user, capture an involuntary signal and a voluntary signal, and avoid noise;
prompting a reaction of the user to presented content, wherein the reaction of the user comprises a movement password;
based on capturing information indicative of the movement password, authenticate an identity of the user,
based on authenticating the identity of the user, prompt the user to imagine a thought password;
capture information indicative of:
the involuntary signal generated, by the user, based on being prompted to imagine the thought password, and
the voluntary signal generated, by the user, in response to being prompted to imagine the thought password,
determine, based on the involuntary signal and the voluntary signal, a combined signal; and
compare the combined signal to authentication credentials associated with the user.

16. The device of claim 15, wherein the comparing comprises comparing at least one of:
a signal deflection of the involuntary signal,
a timing of the signal deflection, and
a mu rhythm associated with the involuntary signal.

17. The device of claim 15, wherein the comparing comprises:
determining that one or more characteristics associated with the combined signal is associated with the user.

18. The device of claim 17, wherein the one or more characteristics comprises an event-related desynchronization in at least one of: an alpha frequency band, a mu frequency band, a beta frequency band, or a low gamma frequency band.

* * * * *